(12) United States Patent
Spyropoulos et al.

(10) Patent No.: US 9,778,083 B2
(45) Date of Patent: Oct. 3, 2017

(54) METROLOGY METHOD FOR TRANSIENT GAS FLOW

(71) Applicant: Lam Research Corporation, Fremont, CA (US)

(72) Inventors: Evangelos Spyropoulos, San Jose, CA (US); Iqbal Shareef, Fremont, CA (US)

(73) Assignee: LAM RESEARCH CORPORATION, Fremont, CA (US)

(*) Notice: Subject to any disclaimer, the term of this patent is extended or adjusted under 35 U.S.C. 154(b) by 1176 days.

(21) Appl. No.: 13/896,108

(22) Filed: May 16, 2013

(65) Prior Publication Data

US 2014/0343875 A1    Nov. 20, 2014

(51) Int. Cl.
*G01F 25/00* (2006.01)
*G01F 1/34* (2006.01)

(52) U.S. Cl.
CPC ....... *G01F 1/34* (2013.01); *B01J 2219/00216* (2013.01); *G01F 25/0007* (2013.01); *G01F 25/0038* (2013.01); *G01F 25/0092* (2013.01)

(58) Field of Classification Search
CPC .................. G01F 25/0038; G01F 25/0053
USPC .......................................................... 702/47
See application file for complete search history.

(56) References Cited

U.S. PATENT DOCUMENTS

| | | | |
|---|---|---|---|
| 5,684,245 A | 11/1997 | Hinkle | |
| 6,221,221 B1 | 4/2001 | Al-Shaikh et al. | |
| 7,174,263 B2 | 2/2007 | Shajii et al. | |
| 7,376,520 B2 | 5/2008 | Wong et al. | |
| 7,412,986 B2 | 8/2008 | Tison et al. | |
| 7,424,895 B2 | 9/2008 | Tison et al. | |
| 7,461,549 B1 | 12/2008 | Ding et al. | |
| 7,647,187 B2 | 1/2010 | Lerner | |
| 7,757,554 B2 | 7/2010 | Ding et al. | |
| 7,822,570 B2 | 10/2010 | Shareef et al. | |
| 7,823,436 B2 | 11/2010 | Monkowski et al. | |
| 7,835,874 B2 | 11/2010 | Wong et al. | |
| 7,881,886 B1 | 2/2011 | Shareef et al. | |
| 7,891,228 B2 | 2/2011 | Ding et al. | |

(Continued)

OTHER PUBLICATIONS

Savitsky, Smoothing and Differentiation of Data by Simplified Least Squares Procedures, The Perkin-Elmer Corp. Analytical Chemistry, vol. 36, No. 8, Jul. 1964, pp. 1627-1639.*

*Primary Examiner* — Janet Suglo
*Assistant Examiner* — Michael Dalbo (57) ABSTRACT

A method of calculating a transient flow rate of a flowed process gas comprises flowing process gas through a mass flow controller into a chamber of known volume and measuring successive data sample points which include pressure data, temperature data, and a time value for each successive data sample point. Groups of successive data sample points are identified wherein each group shares one or more successive data sample points with another group, and ratio values are calculated for each of the successive data sample points wherein each ratio value is a ratio between the pressure data and a product of temperature and gas compressibility data for each respective time value. A line of best fit of the ratio values is determined within at least one group, and then the transient flow rate of the flowed process gas is calculated using a pressure rate of rise technique wherein the pressure rate of rise technique utilizes a ratio value determined from the line of best fit for at least one time value within the at least one group.

20 Claims, 4 Drawing Sheets

(56) References Cited

U.S. PATENT DOCUMENTS

| | | |
|---|---|---|
| 7,905,139 B2 | 3/2011 | Lull |
| 8,150,646 B2 | 4/2012 | Shareef et al. |
| 8,248,233 B2 | 8/2012 | Silverman et al. |
| 8,265,888 B2 | 9/2012 | Chung et al. |
| 8,756,022 B2* | 6/2014 | Franklin .......................... 702/51 |
| 2006/0005882 A1* | 1/2006 | Tison .................. G01F 25/0038 137/487.5 |
| 2010/0076740 A1* | 3/2010 | Kuchuk ................ E21B 49/087 703/10 |

* cited by examiner

FIG. 2C ized, the downstream valve may be closed, and as a result the gas pressure may begin to rise in the volume. The pressure sensor may measure the pressure rise. This measurement may be used to calculate the inlet flow rate to the MFV, thereby verifying the gas flow accuracy performance of the DUT.

METROLOGY METHOD FOR TRANSIENT GAS FLOW

FIELD OF THE INVENTION

The present invention relates to a metrology method for measuring gas flows and more specifically the present invention relates to a method of calculating a transient flow rate of a flowed process gas such that transient flow anomalies of the flowed process gas which is flowed through a mass flow controller into a test chamber of known volume may be detected.

BACKGROUND

High-precision gas delivery and measurement systems such as mass flow controllers (MFCs) are useful in applications such as semiconductor wafer fabrication and other types of materials processing. In many instances, the accuracy of these gas delivery systems needs to be verified.

Mass flow verifiers (MFVs) may be used to verify the accuracy of an MFC, or other fluid delivery device-under-test (DUT). One type of a mass flow verifier is a rate-of-rise (ROR) flow verifier. A typical ROR flow verifier may include a test chamber volume, a pressure sensor, a temperature sensor, and two isolation valves, one upstream and one downstream. The valves may be closed during idle, and may open when a metrology test run is initiated, allowing flow of gas from the MFC through the flow verifier. Once gas flow has stabilized, the downstream valve may be closed, and as a result the gas pressure may begin to rise in the volume. The pressure sensor may measure the pressure rise. This measurement may be used to calculate the inlet flow rate to the MFV, thereby verifying the gas flow accuracy performance of the DUT.

SUMMARY

In a first embodiment, a method of calculating a transient flow rate of a flowed process gas uses a pressure rate of rise technique while the process gas is flowed through a mass flow controller to a chamber of a known volume. The method comprises flowing process gas through the mass flow controller into the chamber and measuring successive data sample points which include pressure data, temperature data, and a time value for each successive data sample point. Groups of successive data sample points are identified wherein each group shares one or more successive data sample points with another group, and ratio values are calculated for each of the successive data sample points wherein each ratio value is a ratio between the pressure data and a product of temperature and gas compressibility for each respective time value. A line of best fit of the ratio values is determined within at least one group, and then the transient flow rate of the flowed process gas is calculated using a pressure rate of rise technique wherein the pressure rate of rise technique utilizes a ratio value determined from the line of best fit for at least one time value within the at least one group.

In a second embodiment, a method of calculating a transient flow rate of a flowed process gas uses a line of best fit of pressure and temperature data while the process gas is flowed through a mass flow controller to a chamber of a known volume. The method comprises flowing process gas through the mass flow controller into the chamber and measuring successive data sample points which include pressure data, temperature data, and a time value for each successive data sample point. Groups of successive data sample points are identified wherein each group shares one or more successive data sample points with another group. A line of best fit of the pressure data within at least one group is determined and a line of best fit of the temperature data within the at least one group is determined. The transient flow rate of the flowed process gas is then calculated using a pressure rate of rise technique wherein the pressure rate of rise technique utilizes a pressure value determined from the line of best fit for at least one time value within the at least one group and a temperature value determined from the line of best fit for the at least one time value with the at least one group.

DETAILED DESCRIPTION

Disclosed herein is a method of calculating a transient flow rate of a flowed process gas wherein the process gas is delivered through a mass flow controller to a test chamber of a known volume. In the following description, numerous specific details are set forth in order to provide a thorough understanding of the present embodiments. It will be apparent, however, to one skilled in the art that the present embodiments may be practiced without some or all of these specific details. In other instances, well known process operations have not been described in detail in order to not unnecessarily obscure the present embodiments.

Accurate measurements of rates of process gas flow and the detection of gas flow anomalies are applicable to a number of modern semiconductor wafer fabrication processes, such as continuous plasma etching, which require a process gas to be supplied in a carefully controlled manner to a reaction chamber. As defined herein, a transient flow rate of process gas flow is the deviation of the flow rate over time from a set point flow rate (or set point) wherein the set point flow rate may be a predetermined steady state flow or may be configured to be a variable flow rate. Deviations of the transient flow rate from the set flow rate illustrate transient flow anomalies. Calculating a transient flow rate of the process gas flow, provides a more accurate representation of the actual flow rate of the process gas flow (as compared to calculating a steady state flow rate of the flowed process gas with a standard flow rate technique discussed herein), as well as illustrates transient flow anomalies which may not be normally detected. For example, transient flow anomalies can occur during a steady state flow, during a turn-on period when process gas first begins to flow until a point wherein the process gas flow rate increases to a predetermined set point, or during a turn-off period wherein a set point flow rate of a process gas flow rate is halted and the flow rate decreases until the process gas ceases to flow. Additionally, transient flow anomalies can occur during a transition period wherein the flow rate of the process gas is adjusted from a first set point to a second set point according to a process recipe. In most cases, the delivery of process gas during semiconductor wafer fabrication processes requires that the process gas flow rates be carefully controlled. More specifically, the flow rate of process gas flowed, during the steady state period, turn-on period, transition period, and/or the turn-off period, to the reaction chamber should be controlled such that gas flow set points defined by a process recipe of the fabrication process are met. A flow period, which may also be defined by a process recipe, is the length of time between a turn-on period and a turn-off period. Transient flow anomalies such as flow overshoots and/or flow undershoots during MFC turn-on and turn-off periods as well as process gas flow delays during a transition period may lead to process shifts and may affect wafer processing, accuracy, or repeatability.

Process gas flow is also commonly controlled by an MFC upstream from a reaction chamber. Thus, the accuracy at which the process gas flow rate can be controlled is generally dictated by the accuracy of the MFC through which the process gas is required to pass. Therefore, MFC's should be tested to determine whether transient flow anomalies such as flow overshoots and/or flow undershoots exist before implementing the MFC in a plasma processing system.

Figure 1:
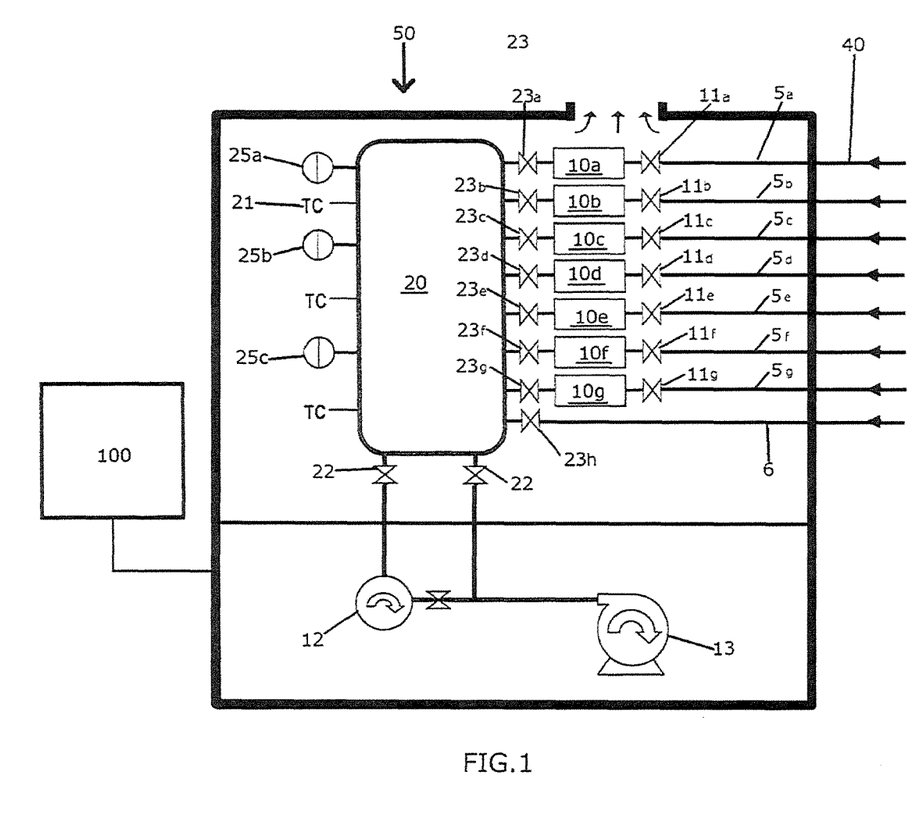
FIG. 1 shows a schematic of a mass flow verifier arrangement wherein methods disclosed herein may be practiced.

FIG. 1 is a schematic view of a mass flow verifier (MFV) 50 configured to utilize a pressure rate of rise (RoR) technique comprising a plurality of mass flow controllers (MFCs) 10a-g which may be tested. The MFV 50 may be used to practice methods described herein. The MFV 50 includes an enclosed test chamber 20 of a known volume that can receive a flow of process gas from any of the MFCs 10a-g. The MFCs 10a-g each control the flow rate of the process gases delivered therethrough. Inlet valves 23a-g shut on and off the flow of process gas from each respective MFC 10a-g into the test chamber 20. Outlet valves 22 shut on and off the flow of the gas from the test chamber 20 to an evacuation area (not shown). Additionally, the MFV 50 includes at least one vacuum pump, which provides a vacuum source for evacuating and purging the test chamber 20. In a preferred embodiment the test chamber 20 may be in fluid communication with a turbomolecular pump 12 and a mechanical pump 13.

The MFV 50 further includes at least three pressure sensors 25a-c and at least one temperature sensor (TC) 21 configured to measure the pressure and the temperature of the gas within the test chamber 20, respectively. The at least three pressure sensors 25a-c may each be manometers, or other suitable sensors for measuring the internal pressure of the test chamber 20. Each pressure sensor is configured to be sensitive to a different range of pressures. In one embodiment, the first manometer 25a can be capable of measuring pressures of up to about 100 mTorr, the second manometer 25b can be capable of measuring pressures of up to about 10 Torr, and the third manometer 25c can be capable of measuring pressures of about 10 mTorr to about 400 Torr. The first and second manometers 25a,b can be purchased from MKS Instruments of Andover Mass. The third manometer 25c can be purchased from Paroscientific, Inc. of Redmond Wash.

The first and second pressure sensors 25a,b preferably have fast response times and are preferably capable of taking readings from about every 0.5 milliseconds to about every 5 milliseconds. It is preferable to take readings in short intervals such that transient gas flow anomalies which have short lifespans may be observed. The third pressure sensor 25c, which is responsive to a broad range of pressures may be used as a reference sensor to sensors 25a,b. Additionally, the third pressure sensor 25c, which has a slower response time, may be used to measure steady state standard flow rates of the process gas directed into test chamber 20. An exemplary chamber configuration for measuring steady state standard flow rates of a process gas may be found in commonly-assigned U.S. Pat. No. 7,376,520 which is incorporated by reference herein in its entirety.

It should be appreciated that in other embodiments the maximum pressure measurable by the first pressure sensor 25a can be less than 100 mTorr. The measurable pressure ranges of the second and third pressure sensors 25b,c may also vary, however, the maximum and minimum measurable pressures of each of the pressure sensors 25a-c should be established such that gas flow rates and transient gas flow rates can be accurately calculated using the pressure and temperature measurements over an anticipated operating range of gas flow rates and within time constraints established for the gas flow rate measurements.

The basic principle of a RoR technique for a MFV is to measure a change in mass balance in the test chamber 20. Using the mass balance equations, and applying the ideal gas law with gas compressibility correction to the gas in the test chamber, a standard flow rate (SFR) can be obtained by measuring the gas pressure and the gas temperature, over time, in the chamber of the MFV according to the following equation:

$$SFR=(dm/dt)(1/d_{std})=(T_{std}/p_{std})(V)(d(p/(T*Z))/dt), \quad \text{Equation 1}$$

wherein $d_{std}$, $T_{std}$, and $p_{std}$ are respectively standard density, standard temperature, and standard pressure per SEMI E12-0303 (Standard for Standard Pressure, Temperature, Density, and Flow Units Used in Mass Flow Meters and Mass Flow Controllers), and m is the mass of the gas, V is the test chamber volume, T is the gas absolute temperature, Z is the gas compressibility factor, p is pressure. Generally, the standard flow rate (SFR) is determined by calculating the change in mass (m) of the process gas over time (d/dt) and dividing by the standard density of the process gas.

The mass flow controllers 10a-g are each configured to receive pressure regulated process gases from a gas supply facility (not shown). Process gas travels through gas lines 5a-g, through a respective frontside control valve 11a-g and into a respective MFC 10a-g, wherein the MFC 10a-g may deliver the process gas to the test chamber 20. The gas supply facility is configured to deliver a specifically formulated process gas to each MFC, wherein each MFC can control the flow rate and flow period of the process gas to the test chamber 20.

An accuracy of the gas flow rate exiting each MFC 10a-g and subsequently entering the test chamber 20 is dictated by the calibration and condition of the MFCs 10a-g. Therefore, it is desirable that each MFC 10a-g is capable of controlling its respective gas flow rate within an allowable tolerance range. In order to ensure that transient gas flow rates into the test chamber 20 during steady state, turn-on, transition, and/or turn-off periods are acceptable, it is necessary to verify the calibration and condition of each MFC 10a-g.

With reference to Equation 1 above, the volume used to determine the gas flow rate being provided by a particular MFC 10a-g includes all fluidly connected plumbing volumes from the output of the particular MFC 10a-g through test chamber 20. Therefore, it is desirable that the plumbing between each MFC 10a-g and test chamber 20 be well-defined and understood.

The test chamber 20 preferably has a volume large enough to reduce the compressibility effects of the gas supplied therein. Preferably, the volume of the test chamber 20 is about 10 to 100 liters, more preferably the test chamber 20 volume is about 15 to 50 liters. In alternate embodiments the test chamber 20 may have a volume greater than 100 liters. In alternate embodiments, volumes less than 10 liters may be used, such as about 5 liters, about 1 liter, about a half liter, or even less may be used, however the compressibility effects of gases supplied therein can have greater affects and may therefore need to be accounted for.

The test chamber 20 may optionally include an actively controlled heater 40 for maintaining an elevated temperature in test chamber 20. The heater may be incorporated in any of the gas lines, such as gas line 5, and/or a heater may be incorporated in the test chamber 20. Temperature in the test chamber 20 can be monitored by at least one temperature sensor 21 located within test chamber 20. The at least one temperature sensor 21 can be a thermocouple or other suitable temperature sensor. In a preferred embodiment, the MFV 50 comprises three temperature sensors 21. The three temperature sensors 21 are preferably configured such that an average temperature in the test chamber 20 may be ascertained. Preferably, the temperature sensors 21 measure the temperature of the process gas entering the test chamber 20. In alternate embodiments, the temperature sensors 21 may be configured to measure the temperature of a chamber wall of test chamber 20.

The MFV 50 includes a control system 100 that receives the output signals from the at least three pressure sensors 25a-c and the at least one temperature sensor 21, and controls the operation of frontside control valves 11, the inlet valves 23, and the outlet valves 22. The control system 100 receives measurements of pressure and temperature of the process gas within the test chamber 20 after the outlet valves 22 are closed, and the control system 100 uses methods described herein to calculate the transient gas flow rate of the process gas flowing into the test chamber according to Equation 1. The control system 100 may then compare the results of the transient gas flow rate to predetermined set points for gas flow, thereby verifying the flow rate of each MFC 10a-g. In alternate embodiments the control system 100 may output, display, store, or otherwise convey the results. In a preferred embodiment the comparison between the calculated transient gas flow rate and the set point or set points for gas flow rates can be used to illustrate transient gas flow anomalies of the flowing process gas.

The test chamber 20 is preferably formed out of stainless steel. The test chamber 20 may be made from a single piece, or in an alternate embodiment the test chamber may be formed from several pieces. In a further embodiment, the test chamber 20 may be machined out of a solid aluminum block. Preferably, the test chamber has good thermal conductivity. Additionally, tubing penetrations into the test chamber 20 can be sealed through use of o-rings as opposed to welding. In other embodiments, welding can be utilized.

During operation of the MFV 50, the heater 40 may be used to maintain an elevated, i.e., above ambient, and uniform temperature within the test chamber 20. The elevated temperature enables flow rate measurements of process gases that otherwise condense at lower temperatures. Condensation of gases downstream from the MFC 10a-g can introduce error in the gas flow rate measurement. Additionally, condensed gases can adversely affect pressure measurements performed using the pressure sensors 25a-c. In an embodiment, the gas inlets leading into the test chamber 20 can be designed to provide a large surface area of contact between the gas stream and heated walls of the gas inlets. Thus, the gas inlets can be designed to pre-heat the gas prior to entering the test volume in order to avoid condensation upon venting into the test volume.

The test chamber 20 and pressure sensors 25a-c provide the MFV 50 the capability to detect changes in pressure such that transient gas flow rates and transient gas flows anomalies may be calculated, as well as steady state gas flows, accurately and repeatably over a wide range of flow rates, e.g., 0.1 sccm to 10,000 sccm, wherein seem refers to standard cubic centimeter(s) per minute. A process recipe may be used to determine which set flow rate should be used as well as include information such as a predetermined length of time to flow the process gas. During testing outlet valves 22 may be opened after a turn-off period to evacuate the process gas from the test chamber 20 volume. Subsequently frontside control valves 11 may be opened to supply process gas to a respective MFC 10a-g, such that said MFC 10a-g may begin a new turn-on period. (i.e. MFCs 10a-g may deliver process gas to test chamber 20 through a respective inlet valve 23a-g.)

The pressure sensors 25a,b are configured to be highly accurate and to have a fast pressure data sampling rate to capture the transient flow anomalies. The pressure sensors 25a,b have a process response time of about 5 to 20 milliseconds. In an embodiment, the pressure sensors 25a,b are configured to have a predetermined pressure data sampling rate of about 0.5 millisecond to about 5 milliseconds. Preferably, the pressure data sampling rate for pressure sensors 25a,b is about 0.5 to 2 milliseconds, and more preferably the pressure data sampling rate is about 1 millisecond.

Preferably the calculated transient flow rate is compared to a gas flow set point of the MFC for each flow period to verify that the MFC is operating within a predetermined flow tolerance, i.e. that flow overshoots and/or undershoots or other transient gas flow anomalies are not occurring during the process gas flows. In general, each MFC 10a-g can be calibrated separately to operate within a respective predetermined flow tolerance. Additionally, it is preferable to verify at least ten gas flows for each MFC 10a-g and calibrate each MFC accordingly. For example, a multi-point gas calibration such as a ten point gas calibration may be performed. The ten point gas calibration includes verification of ten gas flow setpoints equally spaced over the operating range of the MFC 10a-g, beginning with a minimum gas flow rate and ending with a maximum gas flow rate (e.g., beginning at about 10 sccm and ending at about 500 sccm), wherein each MFC 10a-g may be calibrated to perform within respective predetermined flow tolerances.

To detect flow anomalies such as transient flow overshoots and/or undershoots, as well as filter noise from the calculated flow rate, the following method of calculating the transient flow rate is performed. Process gas is flowed through the mass flow controller into the test chamber of a known volume. Preferably the process gas is flowed according to a predetermined process gas flow set point. Successive data sample points of pressure data and temperature data within the volume are measured as a function of time, wherein a time value is assigned to each successive data sample point. The successive data sample points are preferably measured at a predetermined data sampling rate. The pressure data and/or the temperature data are preferably processed with a digital filter such that the processing reduces noise from the pressure data and/or temperature data and provides processed pressure data and/or processed temperature data. Preferably the processing step comprises digitally filtering the pressure and/or temperature data using a least squares curve fit, or alternatively, a multipoint digital filtering process can be used to process the pressure and/or temperature data.

A ratio value between the pressure data and the product of temperature and gas compressibility data is preferably calculated for each time value. Preferably the processed pressure data and/or the processed temperature data is used to calculate each ratio value. After the ratio values are calculated, the successive data sample points which now include the respective ratio values and respective time values are identified into groups. Of course, in an alternate embodiment, the groups may be identified before the ratio values are calculated, wherein the ratio values are calculated for each successive data sample point within an identified group and more preferably within each identified group. The groups of successive data sample points are identified such that each group shares one or more successive data sample points with another group. In other words, each group shares one or more data sample points with an adjacent group such that overlapping groups of successive data sample points are identified.

After the groups of successive data sample points including the ratio values of the pressure data and the product of temperature and gas compressibility data are identified, a line of best fit of the ratio values is determined for at least one group. Preferably a line of best fit is determined for each group of successive data sample points. The line of best fit of the ratio values is preferably a least squares line fit. However, in alternative embodiments, the line of best fit may be a curve which is fitted to the successive data sample points. The line of best fit may then be used to determine a ratio value of pressure data and temperature data for a time value within an identified group, and more preferably for a time value within each identified group. The ratio value determined from the line of best fit may then be incorporated into the standard flow rate equation discussed herein wherein a transient flow rate may then be calculated.

In a further embodiment, a line of best fit is determined for each the pressure data and the temperature data within at least one group, and preferably in each identified group. The respective lines of best fit may then be used to determine a respective pressure value and a respective temperature value from the pressure data and temperature data for a time value within an identified group, and more preferably for a time value within each identified group. The lines of best fit of the pressure data and the temperature data are preferably least squares line fits. However, in alternative embodiments, the lines of best fit may be curves which are fitted to the respective pressure data and temperature data. The pressure value and the temperature value determined from the lines of best fit and the gas compressibility may then be incorporated into the standard flow rate equation discussed herein wherein a transient flow rate may then be calculated.

Preferably the assigned time value is the time value for the median data sample point of each respective group of successive data sample points. Alternatively, the time value is preferably the time value for the mean data sample point in each respective identified group. As used herein, the "median data sample point" is the data sample point which is the middle data sample point of each respective group of successive data sample points. Further, as used herein, the "mean data sample point" is the data sample point which is the arithmetic average data sample point of each respective group of successive data sample points.

During the aforementioned method, and during process gas delivery, measurements of process gas pressure inside the test chamber and temperature of the process gas are taken. The data sample point measurements should be taken at a predetermined data sampling rate during the predetermined time period of process gas delivery. Preferably the predetermined data sampling rate is about 0.5 to 10 milliseconds, such as a data sampling rate of about 1 millisecond, 2 milliseconds, or 5 milliseconds. The successive data sample points are then identified into groups wherein each group shares at least one data sample point with another group. Preferably each identified group shares about 5 to 500 successive data sample points with an adjacent identified group. More preferably each identified group shares about 50 to 150 successive data sample points with an adjacent identified group. For example, identified groups may share 100 successive data sample points with an adjacent identified group. Preferably at least 50% of the successive data sample points of adjacent identified groups are shared. More preferably at least 90% of the successive data sample points of adjacent identified groups are shared, and most preferably at least 99% of the successive data sample points of adjacent identified groups are shared.

Figure 2A:
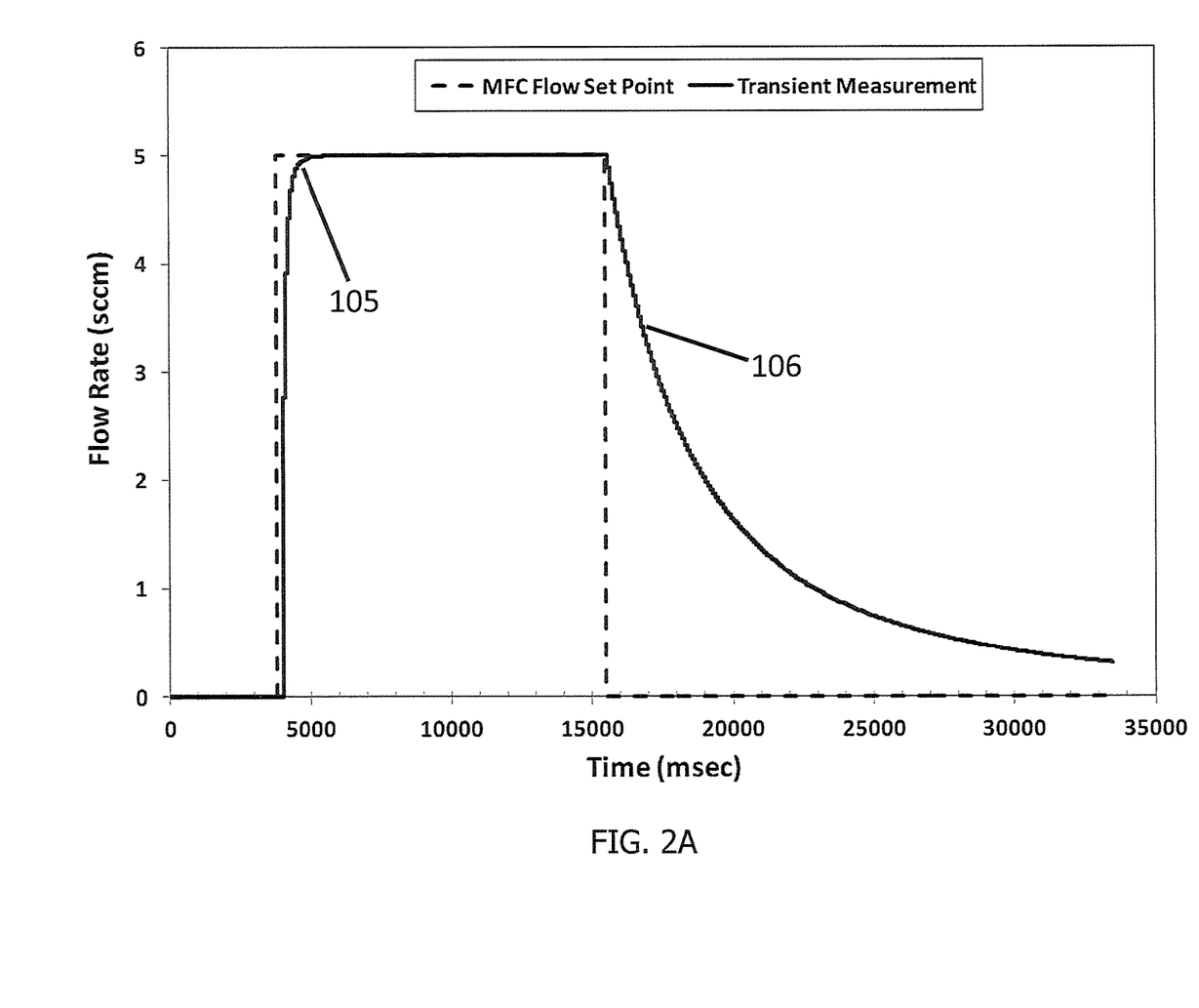
FIGS. 2A-C show flow rate vs. time graphs for process gases tested according to methods disclosed herein.
Figure 2B:
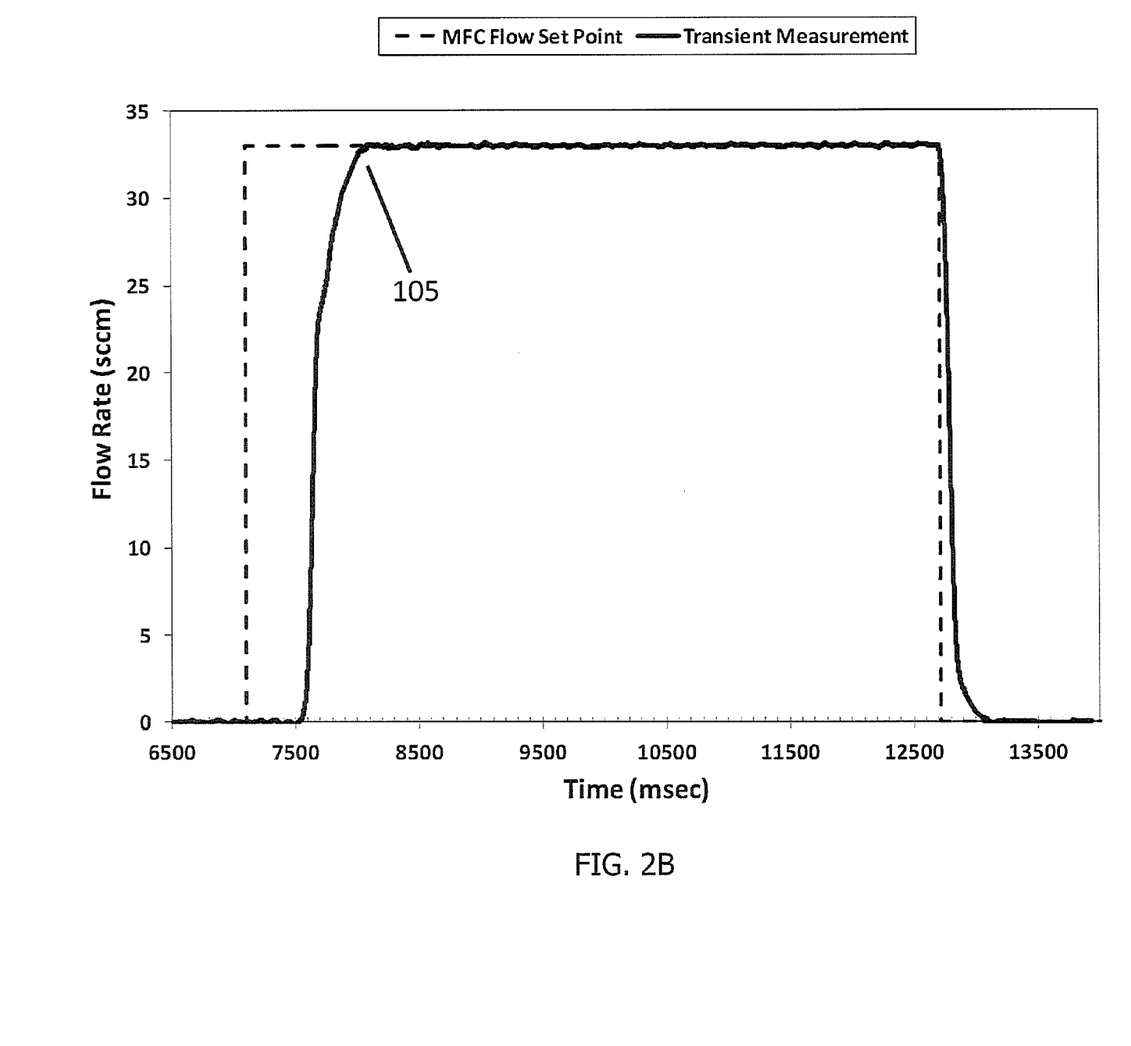
Figure 2C:
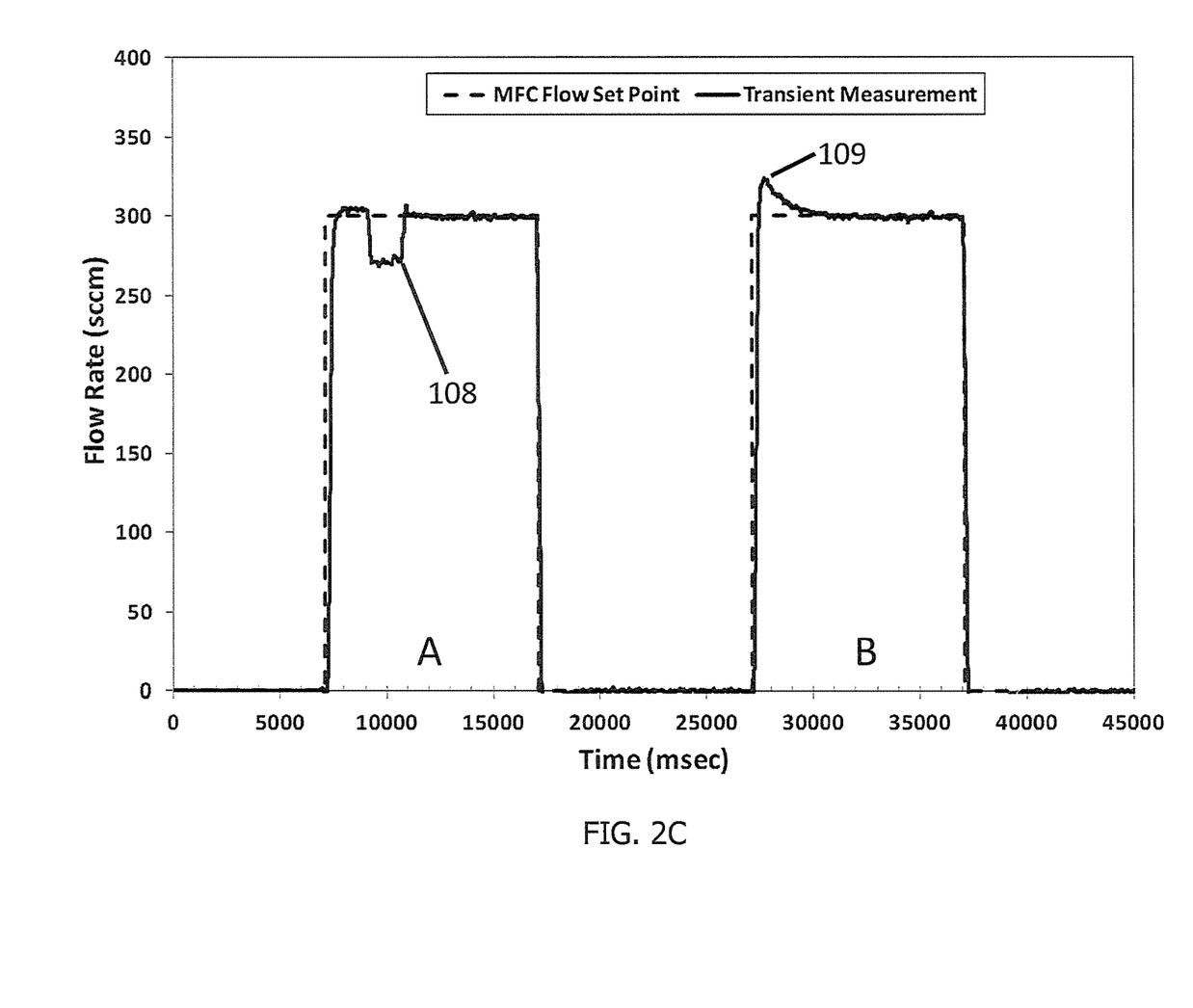

By way of example, and as illustrated in FIGS. 2A-C, transient flow anomalies may be observed using the metrology method disclosed herein. FIG. 2A illustrates transient flow anomalies for $N_2$ gas wherein the set point flow rate is 5 sccm and the flow period lasts for about 11 seconds. In this example, an MFC process gas flow delay 105 is detected during a settling period of the gas flow turn-on period, as well as an exponential decay of gas flow 106 which is detected during the gas flow turn-off period.

FIG. 2B also details transient flow anomalies, i.e. deviations from the MFC set points, mainly during a turn-on period for MFC gas flow. Transient flow anomalies for $N_2$ gas are shown, wherein the set point flow rate is 33 sccm and the flow period lasts for about 5.5 seconds. In this example, an MFC process gas flow delay 105 is detected during a settling period of the gas flow turn-on period.

FIG. 2C shows details of transient flow anomalies during two consecutive flow periods A and B. In this example, the MFC is delivering $O_2$ gas at a set point flow rate of 300 sccm, wherein each flow period lasts for about 10 seconds. During the first flow period A, the metrology method detected transient MFC flow undershoot 108, and during the second flow period B, the metrology method detected transient MFC flow overshoot 109. As illustrated, the metrology method detected an overshoot or an undershoot during the MFC turn-on and turn-off periods in each of the two flow periods. When flow overshoots and/or flow undershoots are observed, this may signal a defective MFC 10a-g, i.e. that the MFC 10a-g needs to be replaced, recalibrated, or the transient flow anomalies may signal a blockage in a gas line comprised in said MFC 10a-g.

The gas flow rate which may be calculated by control system 100 of the MFV 50 can be compared to the corresponding predetermined process gas setpoint for the MFC 10a-g being tested to determine if the MFC 10a-g is operating within its specified gas flow rate tolerance. If the MFC is not operating within its specified tolerance, an evaluation can be performed to determine if an appropriate equivalent flow rate adjustment factor is applicable, i.e. use of an offset factor, or if the MFC 10a-g needs to be replaced or serviced.

As previously mentioned, the MFV 50 can be connected to the control system 100. Using a combination of digital and analog control devices, the control system 100 controls operation of the MFV 50 in accordance with user specified inputs. Also, the control system 100 functions to acquire data, e.g., pressure, temperature, valve states, associated with the MFV 50 for analysis and presentation to a user. In one embodiment, a graphical user interface (GUI) for controlling the MFV is rendered on a display of a computer system. Additionally, the control system 100 may store the predetermined process recipe, which may include information such as the predetermined time period for the flow period and the predetermined intervals at which process gas pressure and temperature measurements may be taken. The GUI is defined to present a user with a number of options for configuring the MFV 50. In one embodiment, the GUI can provide an option for automated configuration of the MFV 50 based upon a particular gas flow rate calibration test to be performed. For example, through the user interface provided by the GUI, the user can specify that a multiple point gas calibration be performed on one or more MFC 10*a-g* to determine if transient flow anomalies exist. Additionally, the user can be provided with options for specifying a maximum and/or minimum flow rate to be tested for each MFC 10*a-g*. It should be appreciated that any other configurable parameter associated with either the MFV 50 or operation thereof can be presented as a user-configurable item in the GUI.

The control system 100 can also be used to perform the mathematical calculations associated with each transient gas flow rate calculation. For example, the control system 100 can be configured to use data acquired from the MFV 50 to calculate the transient gas flow rate, calculate transient flow anomalies, calculate a corrected gas flow rate, and compare the corrected gas flow rate to MFC calibration records. Furthermore, the control system 100 can be configured to correct gas flow rate measurements for other effects, such as non-ideal gas behavior as a function of pressure, temperature, and specific gas properties. The control system 100 and GUI can be used to archive gas flow rate calibration results. The archived gas flow rate calibration results can be analyzed to identify time-dependent trends or process module-dependent trends.

While the methods herein have been described in detail with reference to specific embodiments thereof, it will be apparent to those skilled in the art that various changes and modifications can be made, and equivalents employed, without departing from the scope of the appended claims.

What is claimed is:

1. A method of calculating a transient flow rate of a flowed process gas, wherein the process gas is flowed through a mass flow controller to a chamber of a known volume, comprising:
    flowing process gas through the mass flow controller into the chamber;
    measuring successive data sample points which include pressure data, temperature data, and a time value for each successive data sample point;
    processing the measured pressure data with a digital filter, wherein the digital filter reduces noise from the measured pressure data and provides processed pressure data;
    identifying groups of successive data sample points wherein each group shares one or more successive data sample points with another group;
    calculating ratio values for each of the successive data sample points wherein each ratio value is a ratio between the processed pressure data and a product of temperature and gas compressibility data for each respective time value;
    determining a line of best fit of the ratio values within at least one group;
    calculating the transient flow rate of the flowed process gas using a pressure rate of rise technique wherein the pressure rate of rise technique utilizes a ratio value determined from the line of best fit for at least one time value within the at least one group; and
    controlling flow of the process gas through the mass flow controller into the chamber based on the calculated transient flow rate.

2. The method of claim 1, wherein the process gas flows through the mass flow controller at a predetermined set point, the method further comprising comparing the calculated transient flow rate against the predetermined set point and determining whether any transient gas flow anomalies are detected.

3. The method of claim 2, further comprising outputting, displaying, and/or storing the calculated transient flow rate of the flowed process gas and/or determining whether any transient gas flow anomalies are detected and outputting, displaying, and/or storing the transient gas flow anomalies of the flowed process gas.

4. The method of claim 1, further comprising processing the measured temperature data with the digital filter before calculating the ratio values, wherein the digital filter reduces noise from the measured temperature data and provides processed temperature data.

5. The method of claim 1, wherein the digital filter processes the pressure data using (a) a least squares curve fit, or (b) a multipoint digital filtering process.

6. The method of claim 1, wherein each group shares (a) about 5 to 500 successive data sample points with an adjacent group; (b) about 50 to 150 successive data sample points with an adjacent group; or (c) about 100 data sample points with an adjacent group.

7. The method of claim 1, wherein the successive data sample points are measured at a predetermined data sampling rate of (a) about 10 milliseconds, (b) about 2 milliseconds, (c) about 1 millisecond or (d) about 0.5 milliseconds.

8. The method of claim 1, wherein each group shares (a) at least about 50% of successive data sample points with an adjacent group; (b) at least about 90% of successive data sample points with an adjacent group; or (c) at least about 99% of successive data sample points with an adjacent group.

9. The method of claim 1, wherein the time value used to determine the ratio value from the line of best fit is (a) a median time value of the group; or (b) a mean time value of the group.

10. The method of claim 1, wherein a control system calculates the transient flow rate of the flowed process gas.

11. The method of claim 10, wherein the control system includes a display which displays the transient flow rate and/or transient flow anomalies.

12. The method of claim 2, and calibrating the mass flow controller wherein the calibration includes verifying a process gas flow set point and calibrating the mass flow controller to operate within a predetermined flow tolerance of the process gas flow set point.

13. The method of claim 2, wherein the mass flow controller undergoes a multi-point gas calibration, the multi-point gas calibration includes verification of at least ten process gas flow set points and calibrating the mass flow controller to operate within a respective predetermined flow tolerance of each process gas flow set point.

14. The method of claim 1, wherein the flow rate of the process gas is about 0.1 sccm to about 10,000 sccm.

15. The method of claim 1, wherein (a) the ratio values for the successive data sample points are calculated before the groups of successive data sample points are identified; or (b) the measured pressure data is processed after the groups of successive data sample points are identified.

16. The method of claim 1, wherein operations of the method are performed by a computer program when executed by one or more processors, the computer program being embedded in a non-transitory computer-readable storage medium.

17. A method of calculating a transient flow rate of a flowed process gas, wherein the process gas is flowed through a mass flow controller to a chamber of a known volume, comprising:

flowing process gas through the mass flow controller into the chamber;

measuring successive data sample points which include pressure data, temperature data, and a time value for each successive data sample point;

identifying groups of successive data sample points wherein each group shares one or more successive data sample points with another group;

calculating ratio values for each of the successive data sample points wherein each ratio value is a ratio between the pressure data and a product of temperature and gas compressibility data for each respective time value;

determining a line of best fit of the ratio values within at least one group;

calculating the transient flow rate of the flowed process gas using a pressure rate of rise technique wherein the pressure rate of rise technique utilizes a ratio value determined from the line of best fit for at least one time value within the at least one group; and controlling flow of the process gas through the mass flow controller into the chamber based on the calculated transient flow rate.

18. The method of claim 17, wherein the process gas flows through the mass flow controller at a predetermined set point, the method further comprising comparing the calculated transient flow rate against the predetermined set point and determining whether any transient gas flow anomalies are detected.

19. A method of calculating a transient flow rate of a process gas flowed through a mass flow controller to a chamber, comprising:

measuring successive data sample points which include pressure data, temperature data, and a time value for each successive data sample point;

identifying groups of successive data sample points;

calculating ratio values for each of the successive data sample points wherein each ratio value is a ratio between the pressure data and a product of temperature and gas compressibility data for each respective time value;

determining a line of best fit of the ratio values within at least one group;

calculating the transient flow rate of the flowed process gas using a pressure rate of rise technique wherein the pressure rate of rise technique utilizes a ratio value determined from the line of best fit for at least one time value within the at least one group; and controlling flow of the process gas through the mass flow controller into the chamber based on the calculated transient flow rate.

20. The method of claim 19, wherein the process gas flows through the mass flow controller at a predetermined set point, the method further comprising comparing the calculated transient flow rate against the predetermined set point and determining whether any transient gas flow anomalies are detected.

* * * * *